United States Patent [19]
Gibbons

[11] Patent Number: 5,927,917
[45] Date of Patent: Jul. 27, 1999

[54] SELF-TORQUING NUT

[76] Inventor: Rodney Gibbons, 345-7305 Woodbine Avenue, Markham, Ontario, Canada, L3R 3V7

[21] Appl. No.: 09/111,259

[22] Filed: Jun. 15, 1998

[51] Int. Cl.⁶ .............................. F16B 31/00; F16B 33/04
[52] U.S. Cl. .................................... 411/4; 411/3; 411/917
[58] Field of Search ................................. 411/2, 3, 4, 5, 411/917

[56] References Cited

U.S. PATENT DOCUMENTS

| | | | |
|---|---|---|---|
| 3,191,486 | 6/1965 | Gibbens | 411/4 |
| 3,267,792 | 8/1966 | Yackle | 411/4 |
| 4,167,886 | 9/1979 | Seghezzi et al. | 411/4 |
| 5,256,015 | 10/1993 | St. Clair | 411/4 |
| 5,391,033 | 2/1995 | Gibbons . | |

FOREIGN PATENT DOCUMENTS 2186936 8/1987 United Kingdom ...................... 411/4

*Primary Examiner*—Neill Wilson
*Attorney, Agent, or Firm*—Arne I. Fors

[57] ABSTRACT

A tamper-proof, precision, torque limiting nut device is disclosed. The device comprises an inner collar member having a threaded bore to receive a bolt, stud or the like and an outer sleeve member interconnected to the collar by pins or by welds having a shear strength up to a predetermined torque value. The nut can be tightened on a bolt or stud up to the predetermined shear value, above which the pins or welds shear, to achieve tightening of the nut to the desired torque without the use of a torque wrench. Overtorquing and undertorquing are prevented, and tampering with the nut is substantially obviated.

9 Claims, 3 Drawing Sheets

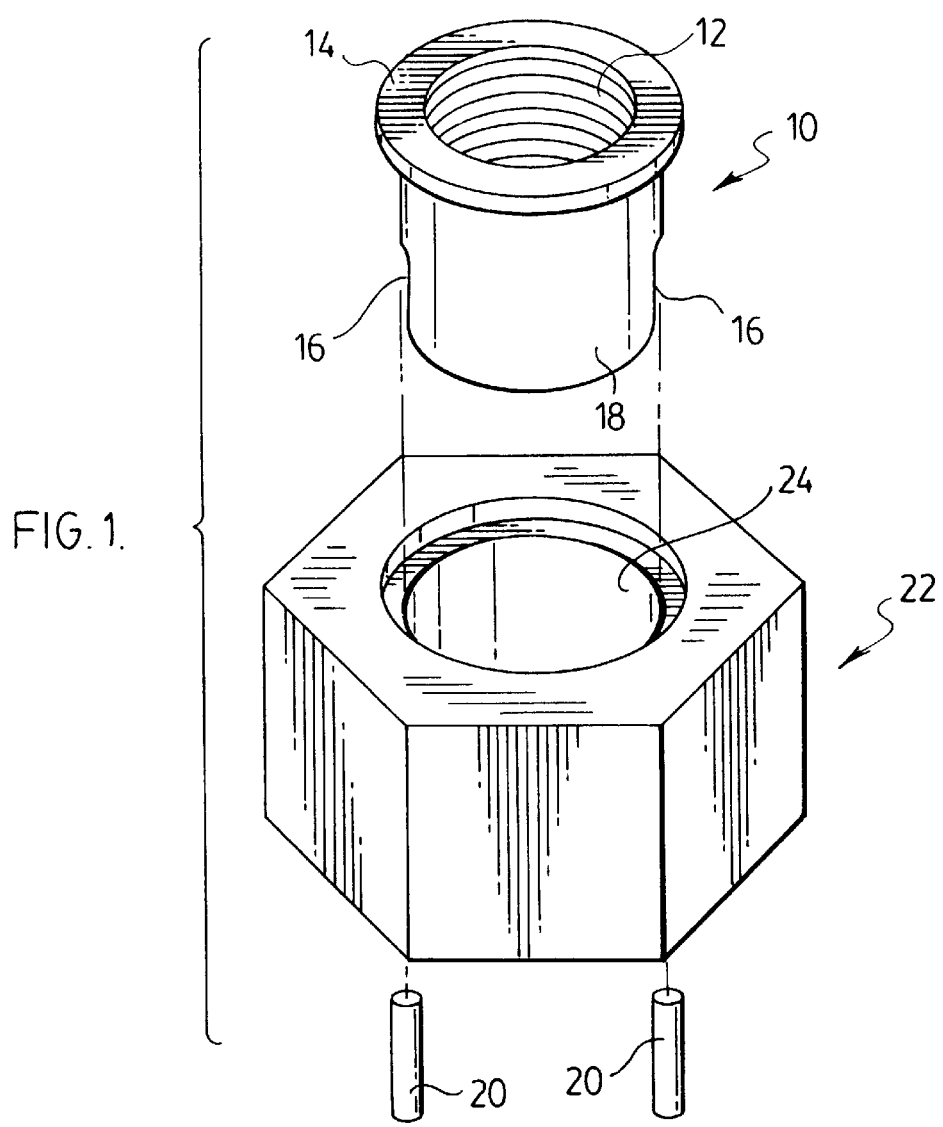
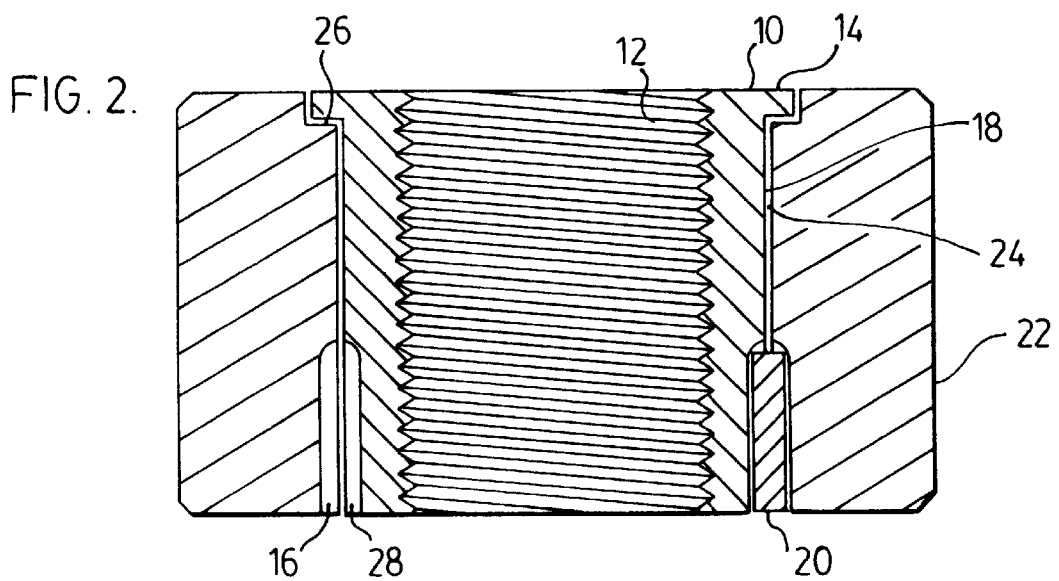

SELF-TORQUING NUT

BACKGROUND OF THE INVENTION

1. Field of the Invention

The present invention relates to a nut device which is torque limiting and may, when assembled, prevent unauthorized disassembly and tampering.

2. Description of the Related Art

Under and over torquing present obstacles in many fields. Devices for accurate torquing, such as torque limiters and torque wrenches are known and used in the assembly of mechanical components such as engine heads on engine blocks to secure head gaskets and even wheel lugs to secure vehicle wheels to axles. The object of such torque limiter devices and wrenches is to provide uniform torquing of bolts without over torquing and shearing.

Problems exist with the prior art tools and systems in that they contain movable parts which are breakable, are expensive, require re-calibration or, for the amateur mechanic or do-it-your-selfer, often are not conveniently available when required.

It is a principal object of the present invention to provide a simple and inexpensive nut device which can be tightened up to a predetermined torque (foot-pounds) with a simple wrench, thereby avoiding over or under torquing.

U.S. Pat. No. 5,391,033 issued Feb. 21, 1995 discloses a nut locking device to prevent unauthorized or undesired removal of nuts from bolts. The nut device of the present invention shears at a predetermined torque, thereby immobilizing the nut on a bolt to prevent its removal.

It is another object of the present invention therefore to provide a nut device which is self-limiting once a predetermined torque is applied to prevent tampering and unauthorized further tightening or removal of the nut. Accordingly, unauthorized over-torquing or removal of a nut locking device is substantially eliminated, thereby improving the security and integrity of structural members such as electrical transmission or communication towers and light standards secured to bases by nut and bolt connectors of the invention.

SUMMARY OF THE INVENTION

In its broad aspect, the torque limiting, tamper-proof nut device of the invention comprises a circular collar having an internal threaded bore coaxial therewith, adapted to receive a bolt, said collar having an enlarged distal end relative to a narrower proximal end, a sleeve having a wrench-engaging outer wall, said sleeve having an inner bore adapted to mate with and loosely receive the collar therein, and shear means adapted to interconnect the collar to the sleeve and to shear at a predetermined torque shear value whereby overtorquing and undertorquing are obviated.

Preferably, the collar has an annular lip at its distal end and the sleeve has a mating annular recess for receiving the collar lip therein and the shear means comprise alignable recesses in the collar and the sleeve for receiving at least one shear pin for interconnecting the collar and sleeve and for shearing at a predetermined torque shear.

In another embodiment, the collar has an outer frusto-conical wall tapering inwardly from its distal end to its proximal end and the sleeve has an inverted mating frusto-conical bore wall adapted to loosely receive the collar for rotation therein. The shear means may comprise alignable recesses in the collar and the sleeve for receiving at least one shear pin for interconnecting the collar and sleeve and for shearing at a predetermined torque shear.

The alignable recesses can be formed longitudinally in the collar outer wall and the sleeve inner bore for receiving a shear pin therein, or can be radial or oblique holes formed in the collar and the sleeve for receiving a shear pin therein.

The shear means may comprise at least one weld having a predetermined torque shear interconnecting the collar to the sleeve, said at least one weld being formed at the distal end of the collar and sleeve or at the proximal end of the collar and sleeve.

BRIEF DESCRIPTION OF THE DRAWINGS

Preferred embodiments of the present invention will now be described, by way of example only, with reference to the accompanying drawings, in which:

FIG. 1 is an exploded perspective view of a first embodiment of the nut device in accordance with the present invention;

FIG. 2 is an enlarged longitudinal section, partly in elevation, of the nut device shown in FIG. 1;

DESCRIPTION OF THE PREFERRED EMBODIMENT

Figure 3:
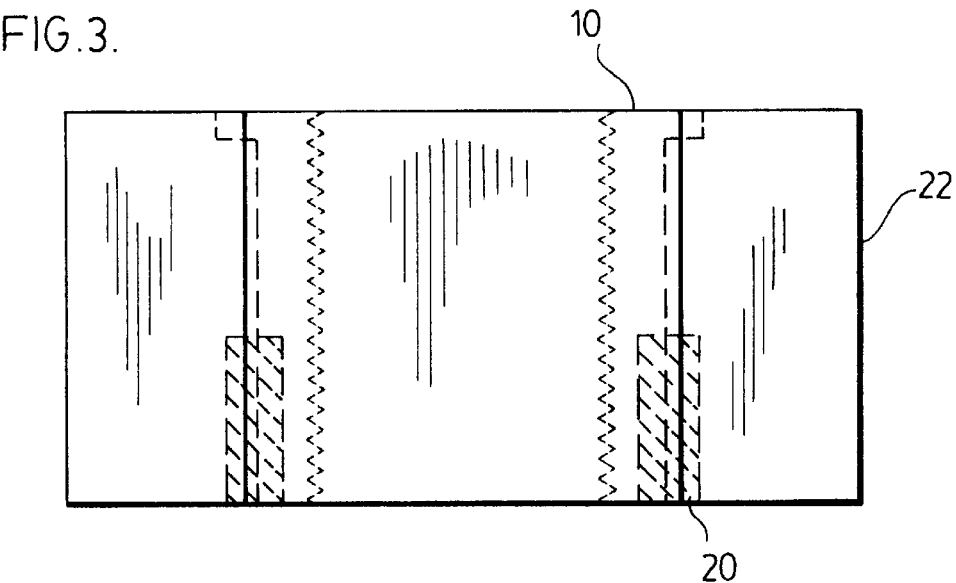
FIG. 3 is a schematic side elevation of the nut device shown in FIGS. 1 and 2.

With reference to FIG. 1, showing the elements of the apparatus before assembly, there is provided a collar 10 having a threaded bore 12 adapted to receive a threaded bolt or stud, not shown. Collar 10 has an outer annular lip 14 at its distal end and a pair of diametrically opposed recesses 16 formed in its outer cylindrical wall 18 at its proximal end for receiving shear pins 20, to be discussed.

Collar 10 is adapted for a loose fit within sleeve 22 which has a smooth inner bore 24, as shown most clearly in FIG. 2, with annular lip 14 seated in annular sleeve recess 26. Pins 20, one of which is shown inserted in recess 16 in collar 10 which is aligned with a mating recess 28 formed on the inner bore 24, interconnect collar 10 with sleeve 22 when assembled.

Sleeve 22 conventionally has a hexagonal outer shape for facile engagement by a wrench.

Collar 10 and sleeve 22 may be made of steel or stainless steel and shear pins 20 may be made of steel, aluminum, brass, copper, lead, plastic and the like. It is essential that the pin be of a predetermined length and diameter for a desired cross sectional area to achieve a precise torque shear value for each nut size or application, as typified in FIG. 3.

Figure 4:
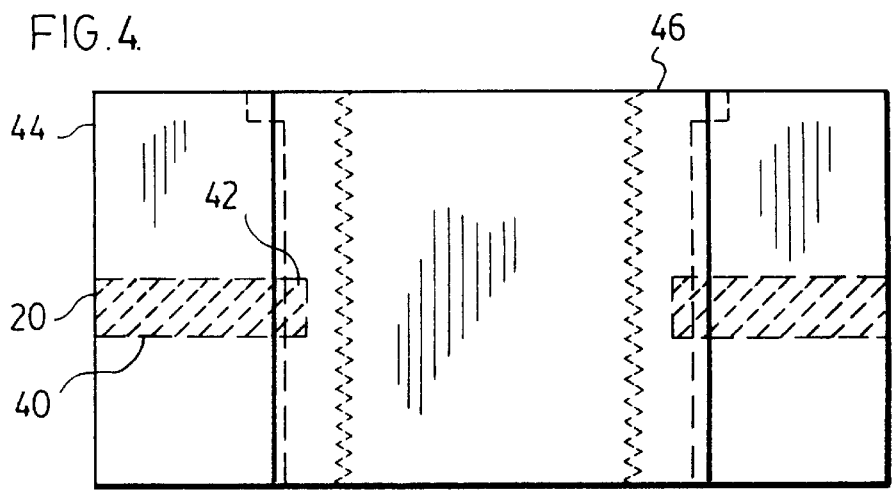
FIG. 4 is a schematic side elevation of a second embodiment of nut device of the invention.
Figure 5:
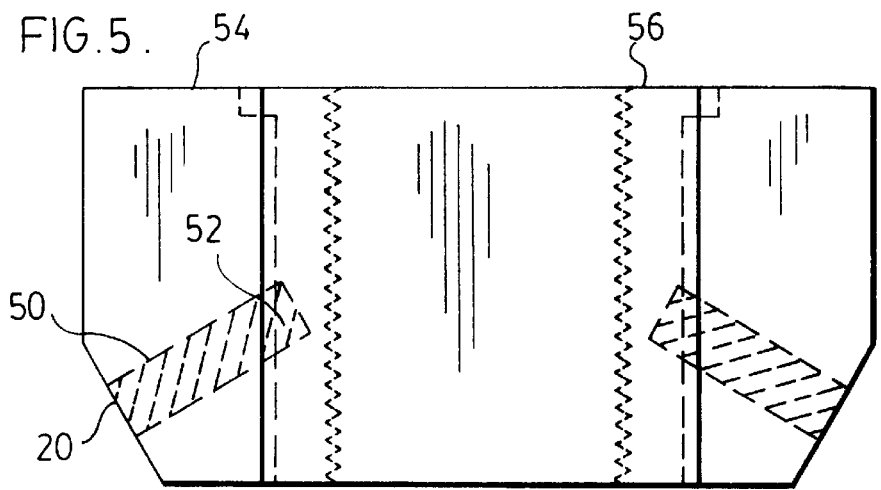
FIG. 5 is a schematic side elevation of a third embodiment of the invention.
Figure 6:
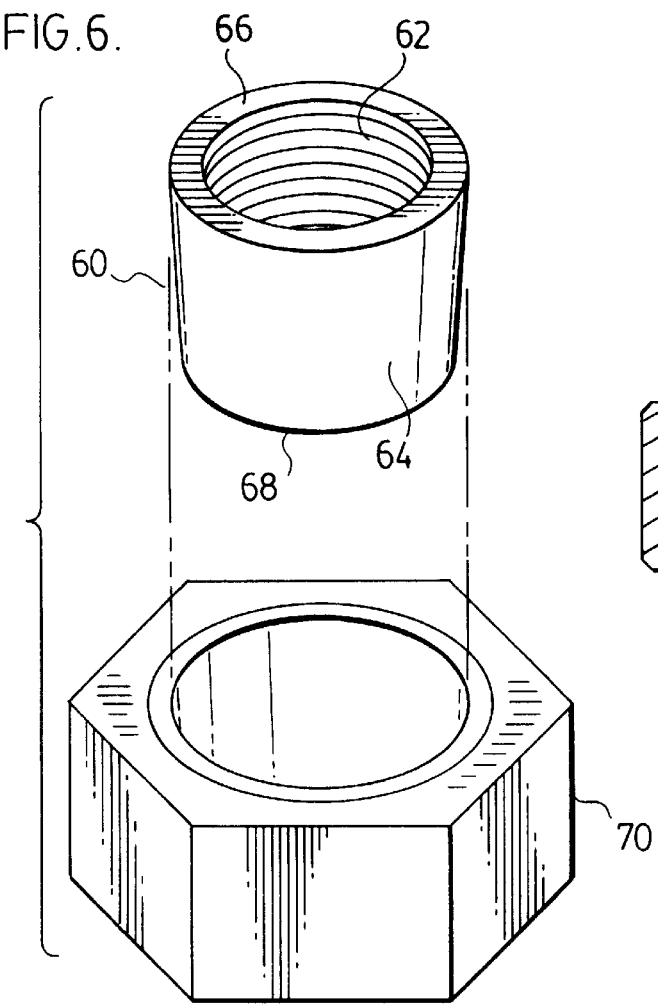
FIG. 6 is an exploded perspective view of a further embodiment of nut device of the invention.
Figure 7:
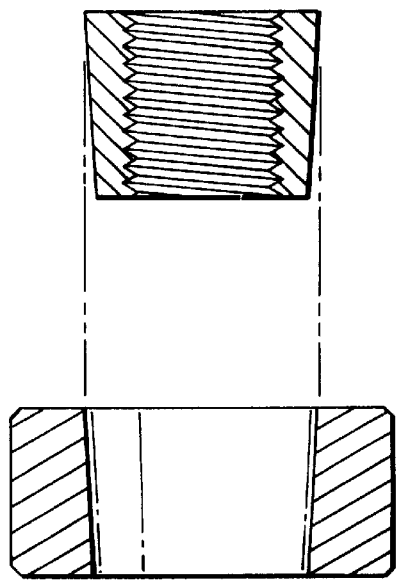
FIG. 7 is a cross section of the nut housing and sleeve prior to assembly, corresponding to FIG. 6.

The pin 20 may be inserted within a cavity between the collar and shell at an angle, including longitudinally, transversely and radially obliquely, as shown schematically in FIGS. 3, 4 and 5.

The embodiment of FIG. 3 has been discussed with reference to FIGS. 1 and 2 above. The embodiment of FIG.

4 has pins 20 mounted in aligned radial holes 40, 42 in sleeve 44 and collar 46 respectively. The transverse sectional areas of pins 20 at the junctures between sleeves 44 and collar 46 determine the torque shear value.

The embodiment of FIG. 5 has pins 20 mounted in aligned oblique holes 50, 52 in sleeve 54 and collar 56 respectively. The transverse sectional areas at the junctures between sleeves 54 and collar 56 determine the torque shear value.

FIGS. 6–9 illustrate another embodiment of my invention to which collar 60 has a threaded bore 62 adapted to receive a threaded bolt or stud. Collar 60 has an outer frusto-conical wall 64 tapering inwardly from its distal end 66 to its relatively narrow proximal end 68.

Figure 9:
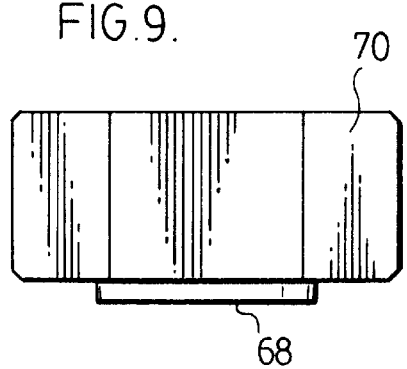
FIG. 9 is a side elevation of the nut device shown in FIG. 8.

Sleeve 70 has an inverted frusto-conical inner wall 72 adapted to loosely receive collar 60 for rotation therein with the proximal end 68 of collar preferably projecting slightly below the lower end of sleeve 70, as typified in FIG. 9.

Figure 8:
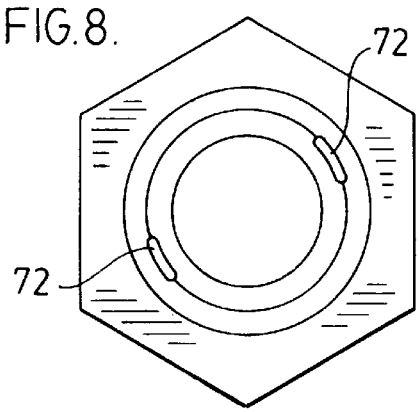
FIG. 8 is a top plan view of the nut device of FIGS. 6 and 7 in assembly wherein the components are interconnected by welds.

Steel, bronze or laser welds 72, shown in FIG. 8, join the distal end of the collar 60 to the sleeve 70, as shown, or the proximal end, not shown, to provide the desired torque shear value. One or a plurality of welds may be provided, depending on the torque shear value desired. In use, the nut device is torqued onto a threaded bolt or stud by engagement of a wrench with the sleeve hexagonal outer wall 70 until the torque shear value of the welds 72 is reached. The shearing of the welds 72 at the predetermined torque results in sleeve 70 loosely turning on collar 60, the proximal end 68 abutting a workpiece surface and the upwardly expanding frusto-conical wall 64 of collar 60 anchoring sleeve 70 thereon.

This invention presents a number of important advantages. The nut device is torque limiting, obviating the need for a calibrated torque wrench. Modifying the size of the nut and the size of the shear pins or welds produces torques of a different shear values. As well, the nut of the invention is substantially resistant to removal and tampering.

It will be understood that modifications can be made in the embodiment of the invention described herein without departing from the scope and purview of the invention as defined by the appended claims.

I claim:

1. A torque limiting device comprising:

a circular collar having an internal threaded bore coaxial therewith, adapted to receive a bolt, said collar having an enlarged distal end relative to a narrower proximal end, a sleeve having a wrench-engaging outer wall, said sleeve having an inner bore adapted to mate with and loosely receive the collar therein, said collar having an annular lip at its distal end and the sleeve having a mating annular recess for receiving the collar lip therein;

shear means adapted to interconnect the collar to the sleeve and to shear at a predetermined torque shear value whereby overtorquing and undertorquing are obviated, said shear means comprising alignable recesses in the collar and the sleeve for receiving at least one shear pin for interconnecting the collar and sleeve and for shearing at a predetermined torque shear, said alignable recesses being oblique holes formed in the collar and the sleeve for receiving shear pins therein.

2. A torque limiting nut device comprising:

a circular collar having an internal threaded bore coaxial therewith, adapted to receive a bolt, said collar having an enlarged distal end relative to a narrower proximal end, a sleeve having a wrench-engaging outer wall, said sleeve having an inner bore adapted to mate with and loosely receive the collar therein, said collar having an outer frusto-conical wall tapering inwardly from its distal end to its proximal end and the sleeve having an inverted mating frusto-conical bore wall adapted to loosely receive the collar for rotation therein, shear means adapted to interconnect the collar to the sleeve and to shear at a predetermined torque shear value whereby overtorquing and undertorquing are obviated.

3. A torque limiting nut device as claimed in claim 2 in which the shear means comprise alignable recesses in the collar and the sleeve for receiving at least one shear pin for interconnecting the collar and sleeve and for shearing at a predetermined torque shear.

4. A torque limiting nut device as claimed in claim 2 in which the alignable recesses are formed longitudinally in the collar outer wall and the sleeve inner bore for receiving a shear pin therein.

5. A torque limiting nut device as claimed in claim 2 in which the alignable recesses are radial holes formed in the collar and the sleeve for receiving a shear pin therein.

6. A torque limiting nut device as claimed in claim 2 in which the alignable recesses are oblique holes formed in the collar and the sleeve for receiving shear pins therein.

7. A torque limiting nut device as claimed in claim 2 in which said shear means comprise at least one weld having a predetermined torque shear interconnecting the collar to the sleeve.

8. A torque limiting nut device as claimed in claim 7 in which said at least one weld is formed at the distal end of the collar and sleeve.

9. A torque limiting nut device as claimed in claim 7 in which said at least one weld is formed at the proximal end of the collar and sleeve.

* * * * *